(12) United States Patent
Ueda

(10) Patent No.: US 10,668,619 B2
(45) Date of Patent: Jun. 2, 2020

(54) CONTROLLER AND MACHINE LEARNING DEVICE

(71) Applicant: FANUC CORPORATION, Yamanashi (JP)

(72) Inventor: Tetsuji Ueda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 120 days.

(21) Appl. No.: 15/995,384

(22) Filed: Jun. 1, 2018

(65) Prior Publication Data
US 2018/0354125 A1  Dec. 13, 2018

(30) Foreign Application Priority Data

Jun. 7, 2017 (JP) ................................. 2017-112191

(51) Int. Cl.
| | | |
|---|---|---|
| *G06F 19/00* | (2018.01) | |
| *B25J 9/16* | (2006.01) | |
| *B25J 13/06* | (2006.01) | |
| *G05B 19/425* | (2006.01) | |

(52) U.S. Cl.
CPC ............ *B25J 9/163* (2013.01); *B25J 9/161* (2013.01); *B25J 9/1653* (2013.01); *B25J 13/06* (2013.01); *G05B 19/425* (2013.01); *G05B 2219/36162* (2013.01); *G05B 2219/39443* (2013.01)

(58) Field of Classification Search
CPC . B25J 9/163; B25J 9/161; B25J 9/1653; B25J 13/06; G05B 19/425; G05B 2219/36162; G05B 19/39443
USPC ................................................. 700/245, 253
See application file for complete search history.

(56) References Cited

U.S. PATENT DOCUMENTS

| | | | | |
|---|---|---|---|---|
| 8,886,359 B2* | 11/2014 | Inaba | ...................... | B25J 9/163 700/245 |
| 9,492,921 B2* | 11/2016 | Inaba | ..................... | B25J 9/0081 |
| 9,604,360 B2* | 3/2017 | Suga | ........................ | B25J 9/163 |
| 9,662,790 B2* | 5/2017 | Iwatake | ................ | G01L 5/0038 |

(Continued)

FOREIGN PATENT DOCUMENTS

| | | |
|---|---|---|
| JP | 2-284886 A | 11/1990 |
| JP | H09258814 A | 10/1997 |

(Continued)

OTHER PUBLICATIONS

Decision to Grant a Patent for Japanese Application No. 2017-112191, dated May 14, 2019, with translation, 5 pages.

(Continued)

*Primary Examiner* — Ronnie M Mancho
(74) *Attorney, Agent, or Firm* — RatnerPrestia

(57) ABSTRACT

A machine learning device of a controller observes, as state variables expressing a current state of an environment, teaching position compensation amount data indicating a compensation amount of a teaching position in control of a robot according to the teaching position and data indicating a disturbance value of each of the motors of the robot in the control of the robot, and acquires determination data indicating an appropriateness determination result of the disturbance value of each of the motors of the robot in the control of the robot. Then, the machine learning device learns the compensation amount of the teaching position of the robot in association with the motor disturbance value data by using the observed state variables and the determination data.

8 Claims, 9 Drawing Sheets

(56) References Cited

U.S. PATENT DOCUMENTS

| | | | |
|---|---|---|---|
| 9,682,475 B2* | 6/2017 | Nagatsuka | B25J 9/163 |
| 9,889,560 B2* | 2/2018 | Maeda | B25J 9/161 |
| 10,105,840 B2* | 10/2018 | Inaba | B25J 9/1602 |
| 10,118,295 B2* | 11/2018 | Oumi | B25J 9/161 |
| 10,175,677 B2* | 1/2019 | Yamaguchi | G05B 19/425 |
| 10,252,418 B2* | 4/2019 | Morimoto | B25J 9/1653 |
| 10,254,741 B2* | 4/2019 | Wang | B25J 9/163 |
| 10,259,116 B2* | 4/2019 | Takahashi | B25J 9/1671 |
| 10,286,551 B2* | 5/2019 | Inaba | B25J 9/163 |
| 10,302,519 B2* | 5/2019 | Arai | B25J 13/06 |
| 10,350,749 B2* | 7/2019 | Wang | B25J 13/08 |
| 10,350,752 B2* | 7/2019 | Satou | G06N 20/00 |
| 2011/0087374 A1 | 4/2011 | Ando et al. | |
| 2014/0244034 A1* | 8/2014 | Toda | B25J 9/161 |
| | | | 700/245 |
| 2016/0075030 A1 | 3/2016 | Takahashi | |
| 2018/0180085 A1 | 6/2018 | Watanabe et al. | |

FOREIGN PATENT DOCUMENTS

| | | |
|---|---|---|
| JP | H09319420 A | 12/1997 |
| JP | 2016059971 A | 4/2016 |
| JP | 2017030135 A | 2/2017 |
| JP | 2017030137 A | 2/2017 |
| JP | 2018103309 A | 7/2018 |
| WO | 2009034957 A1 | 3/2009 |

OTHER PUBLICATIONS

Notification of Reasons for Refusal for Japanese Application No. 2017-112191, dated Feb. 5, 2019, 5 pages.

* cited by examiner

TEACHING BY EXPERIENCED WORKER

TEACHING BY BEGINNER

LOAD IS PUT ON WRIST AXIS OR THE LIKE OF
ROBOT WHEN WORKPIECE GETS SNAGGED
ON JIG OR PRODUCES FRICTION WITH JIG

CONTROLLER AND MACHINE LEARNING DEVICE

CROSS-REFERENCE TO RELATED APPLICATION

This application is a new U.S. Patent Application that claims benefit of Japanese Patent Application No. 2017-112191, filed Jun. 7, 2017, the disclosure of this application is being incorporated herein by reference in its entirety for all purposes.

BACKGROUND OF THE INVENTION

1. Field of the Invention

The present invention relates to a controller and a machine learning device and, in particular, to a controller and a machine learning device that optimize a teaching position.

2. Description of the Related Art

General industrial robots are driven according to a previously-generated operation program or driven to pass through a teaching point previously taught by a teach pendant or the like. That is, the robots are driven along a prescribed track. For example, Japanese Patent Application Laid-open No. 02-284886 discloses, as a related art concerned with the teaching operation of a robot, an invention that performs statistical processing about the deviation between actual position data and a positioning target value from a controller and determines a compensation amount to solve the deviation.

Industrial robots are used for various purposes such as the installation of workpieces, the extraction of machined workpieces, and the attachment of tools to machine tools. When a workpiece is installed in a machine tool using an industrial robot, the operation of holding the workpiece and installing the workpiece in a jig in a machining region is taught by teaching a teaching point to the robot as described above. For example, when a cylindrical workpiece is set with respect to a convex-shaped jig as shown in FIG. 9, the workpiece may be set in such a way as to be moved downward from an approach position to a target position in a direction parallel to the direction of the jig with the hole of the workpiece made parallel to the direction of the jig.

However, when an operator who teaches the operation to the robot is a teaching beginner, the workpiece may not be accurately positioned at the approach position, the direction of the workpiece is inclined at the approach position, the workpiece gets snagged on a jig due to the deviation of a direction in which the workpiece is moved downward from the approach position to the target position, or a frictional force is produced due to the contact between the workpiece and the jig, whereby a disturbance (load) could occur in the wrist shaft or the like of the robot that holds the workpiece. By such teaching, a load is put on each joint of the robot every time the workpiece is installed based on the taught operation, which causes a reason for trouble or a failure in the robot as the operation of the robot is continued.

SUMMARY OF THE INVENTION

In view of the above problem, the present invention has an object of providing a controller and a machine learning device capable of optimizing a teaching position without causing an unnecessary disturbance in the manipulator of a robot.

In order to solve the above problem, a controller according to the present invention performs the machine learning of a compensation amount of a teaching position of a robot with respect to a disturbance produced in a motor that drives each joint of the robot, and compensates and controls the teaching position to reduce the disturbance when the robot moves to the teaching position based on a result of the machine learning.

A controller according to an embodiment of the present invention determines a compensation amount of a teaching position in control of a robot according to the teaching position included in teaching data. The controller includes a machine learning device that learns a compensation amount of the teaching position in the control of the robot according to the teaching position. The machine learning device has a state observation section that observes, as state variables expressing a current state of an environment, teaching position compensation amount data indicating the compensation amount of the teaching position in the control of the robot according to the teaching position and motor disturbance value data indicating a disturbance value of each of the motors of the robot in the control of the robot, a determination data acquisition section that acquires determination data indicating an appropriateness determination result of the disturbance value of each of the motors of the robot in the control of the robot, and a learning section that learns the compensation amount of the teaching position of the robot in association with the motor disturbance value data using the state variables and the determination data.

The state observation section may further observe teaching position data including the teaching position of the teaching data as the state variables, and the learning section may learn the data observed by the state observation section in association with the motor disturbance value data.

The determination data may include, besides an appropriateness determination result of the disturbance value of each of the motors of the robot in the control of the robot, at least any of an appropriateness determination result of a teaching position to which the robot finally moves, an appropriateness determination result of a value detected by a sensor, and an appropriateness determination result of cycle time in the control of the robot according to the teaching position after compensation.

The learning section may have a reward calculation section that calculates a reward associated with the appropriateness determination result, and a value function update section that updates by using the reward, a function expressing a value of the compensation amount of the teaching position relative to the disturbance value of each of the motors of the robot in the control of the robot.

The learning section may perform calculation of the state variables and the determination data on the basis of a multilayer structure.

The controller may further include a decision-making section that outputs a command value based on the compensation amount of the teaching position in the control of the robot according to the teaching position on a basis of a learning result of the learning section.

The learning section may learn the compensation amount of the teaching position in the control of the robot according to the teaching position in each of a plurality of robots by using the state variables and the determination data obtained for each of the plurality of robots.

The machine learning device may exist in a cloud server.

A machine learning device according to another embodiment of the present invention learns a compensation amount of a teaching position in control of a robot according to the teaching position included in teaching data. The machine learning device includes: a state observation section that observes, as state variables expressing a current state of an environment, teaching position compensation amount data indicating the compensation amount of the teaching position in the control of the robot according to the teaching position and motor disturbance value data indicating a disturbance value of each of the motors of the robot in the control of the robot; a determination data acquisition section that acquires determination data indicating an appropriateness determination result of the disturbance value of each of the motors of the robot in the control of the robot; and a learning section that learns the compensation amount of the teaching position of the robot in association with the motor disturbance value data by using the state variables and the determination data.

According to an embodiment of the present invention, it is possible to reduce a disturbance value produced in a motor that drives each joint of a robot and prevent trouble such as the occurrence of a failure in the robot by the compensation of a teaching position of the robot based on a learning result.

DETAILED DESCRIPTION OF THE PREFERRED EMBODIMENTS

Figure 1:
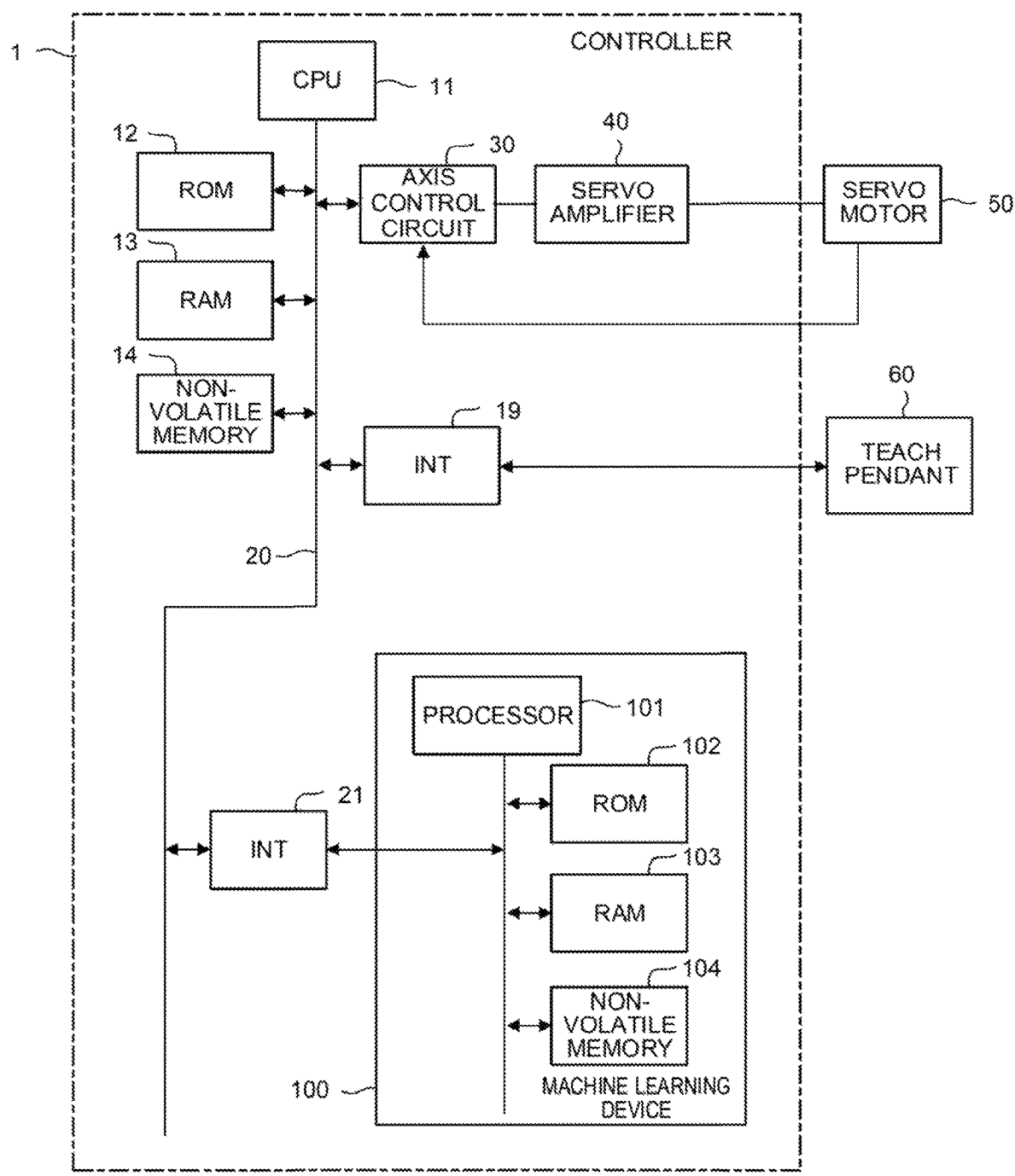
FIG. 1 is a schematic hardware configuration diagram of a controller according to a first embodiment.

FIG. 1 is a schematic hardware configuration diagram showing a controller and the essential parts of a machine tool controlled by the controller according to a first embodiment.

A controller 1 may be mounted as, for example, a controller for controlling an industrial robot (not shown) that performs the installation of a workpiece, the extraction of a machined workpiece, the attachment of a tool to a machine tool, or the like. A central processing unit (CPU) 11 of the controller 1 according to the embodiment is a processor that entirely controls the controller 1. The CPU 11 reads a system program stored in a read-only memory (ROM) 12 via a bus 20 and controls the entire controller 1 according to the system program. A random-access memory (RAM) 13 stores temporary calculation data or display data and various data or the like input by an operator via a teach pendant 60 that will be described later.

A non-volatile memory 14 is constituted as a memory that maintains its storage state by, for example, data backup or the like with a battery (not shown) even if the power of the controller 1 is turned off. The non-volatile memory 14 stores teaching data input from the teach pendant 60 via an interface 19, a robot-controlling program input via an interface (not shown), or the like. Programs or various data stored in the non-volatile memory 14 may be developed into the RAM 13 when run/used. Further, the ROM 12 stores in advance various system programs (including a system program for controlling communication with a machine learning device 100 that will be described later) for running processing for the control of a robot or the teaching of a teaching position, or the like.

The teach pendant 60 is a manual data input device including a display, a handle, a hardware key, or the like. The teach pendant 60 receives information from the controller 1 via the interface 19 to display the same and passes pulses, commands, and various data input from the handle, the hardware key, or the like to the CPU 11.

An axis control circuit 30 for controlling the axis of a joint or the like of a robot receives a movement command amount of the axis from the CPU 11 and outputs a command for moving the axis to a servo amplifier 40. Upon receiving the command, the servo amplifier 40 drives a servo motor 50 that moves the axis of the robot. The servo motor 50 for the axis includes a position/speed detection device and feeds back a position/speed feedback signal from the position/speed detection device to the axis control circuit 30 to perform position/speed feedback control. Note that the axis control circuit 30, the servo amplifier 40, and the servo motor 50 are singly shown in the hardware configuration diagram of FIG. 1 but actually provided corresponding to the number of axes of a robot to be controlled. For example, in the case of a robot including six axes, the axis control circuit 30, the servo amplifier 40, and the servo motor 50 are provided for each of the six axes.

An interface 21 is an interface for connecting the controller 1 and the machine learning device 100 to each other. The machine learning device 100 includes a processor 101 that controls the entire machine learning device 100, a ROM 102 that stores a system program or the like, a RAM 103 that temporarily stores data in each processing associated with machine learning, and a non-volatile memory 104 used to store a learning model or the like. The machine learning device 100 may observe each information (such as position information or a current value of the servo motor 50 and setting information on a running program or teaching information stored in the RAM 13 or the like) capable of being acquired by the controller 1 via the interface 21. Further, upon receiving commands for controlling the servo motor 50 and the peripheral device of a robot output from the machine learning device 100, the controller 1 performs the compensation or the like of a command for controlling the robot based on a program or teaching data.

Figure 2:
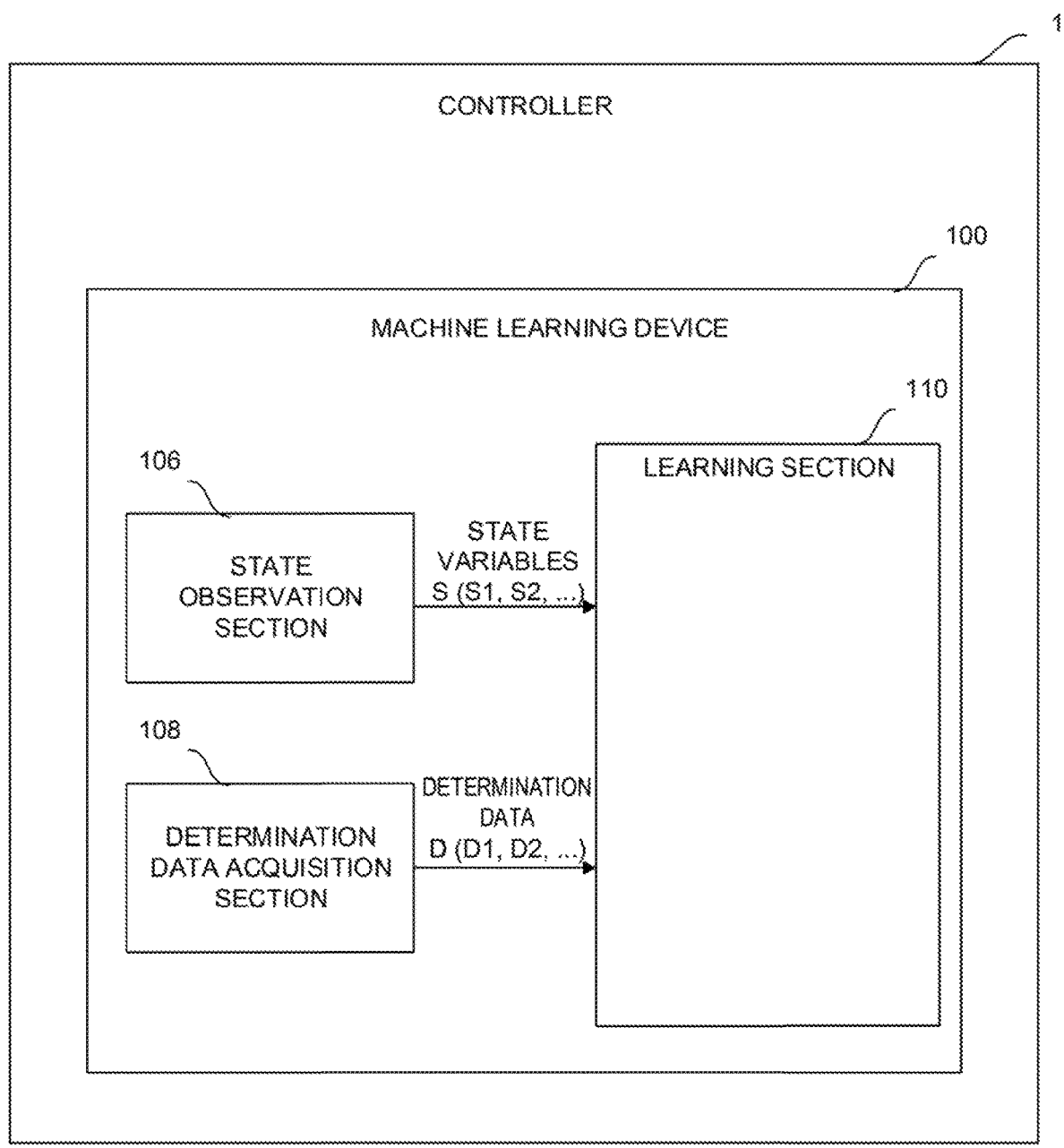
FIG. 2 is a schematic function block diagram of the controller according to the first embodiment.

FIG. 2 is a schematic function block diagram of the controller 1 and the machine learning device 100 according to the first embodiment.

The machine learning device 100 includes software (such as a learning algorithm) and hardware (such as the processor 101) for spontaneously learning a compensation amount of a teaching position of a robot with respect to a disturbance value produced in a motor that drives each joint of the robot through so-called machine learning. An object to be learned by the machine learning device 100 of the controller 1 corresponds to a model structure expressing the correlation between a disturbance value produced in a motor that drives each joint of a robot and a compensation amount of a teaching position of the robot.

As shown in the function block of FIG. 2, the machine learning device 100 of the controller 1 includes a state observation section 106, a determination data acquisition section 108, and a learning section 110. The state observation section 106 observes state variables S, expressing the current state of an environment, including teaching position compensation amount data S1 indicating a compensation amount of a teaching position of each of motors of a robot in the control of the robot according to the teaching position included in teaching data and motor disturbance value data S2 indicating a disturbance value of each of the motors of the robot in the control of the robot according to the teaching position included in the teaching data. The determination data acquisition section 108 acquires determination data D indicating an appropriateness determination result of the disturbance value of the corresponding motor in the control of the robot according to the compensated teaching position. Using the state variables S and the determination data D, the learning section 110 learns the disturbance value of the corresponding motor and the teaching position compensation amount data S1 in association with each other.

Figure 9:
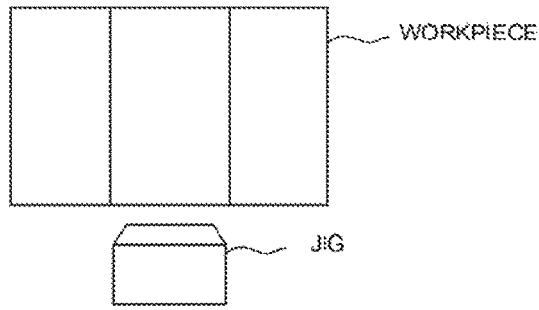
FIG. 9 is a diagram for describing a problem in the teaching of a related art.
Figure 9:
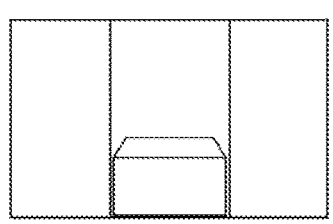
Figure 9:
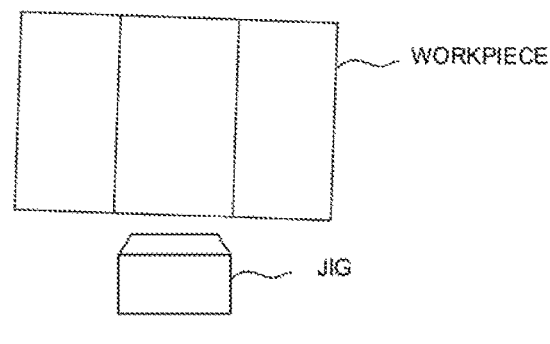
Figure 9:
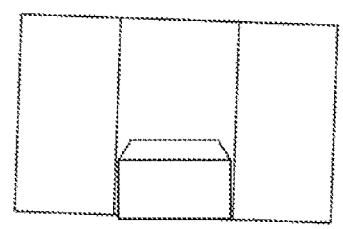

The state observation section 106 may be configured as, for example, one of the functions of the processor 101 or software stored in the ROM 102 for functioning the processor 101. Among the state variables S observed by the state observation section 106, the teaching position compensation amount data S1 may be acquired as a compensation amount with respect to a teaching position (a set of coordinate values of each of the motors of a robot) included in teaching data. The teaching position compensation amount data S1 may be only a compensation amount of a teaching position to which a robot finally moves (a final position when a workpiece is fitted in a jig in the example of FIG. 9). Besides this, the teaching position compensation amount data S1 may include a compensation amount of an approach position indicating a teaching position before the robot finally moves. Further, as the teaching position compensation amount data S1, the maximum value of a disturbance value produced in each motor during movement to a teaching position or a series value obtained when the disturbance value produced in the corresponding motor during the movement to the teaching position is acquired for each prescribed cycle (for example, 10 ms) may be used.

As the teaching position compensation amount data S1, a compensation amount of a teaching position of each of the motors of a robot reported by a skilled worker and given to the controller 1 may be, for example, used. Here, the compensation amount of the teaching position of each of the motors of the robot includes a motor compensation direction (a positive/negative value) in which the motor is corrected. Further, as the teaching position compensation amount data S1, a compensation amount of a teaching position of each of the motors of a robot determined by the machine learning device 100 in the previous learning cycle based on a learning result of the learning section 110 may be used when learning is advanced to a certain extent. In such a case, the machine learning device 100 may temporarily store in advance a determined compensation amount of a teaching position of each of the motors of a robot in the RAM 103 for each of learning cycles so that the state observation section 106 acquires from the RAM 103 the compensation amount of the teaching position of each of the motors of the robot determined by the machine learning device 100 in the previous learning cycle.

Further, as the motor disturbance value data S2 among the state variables S, a load value or the like indirectly calculated from a current value flowing through the servo motor 50 in the control of a robot according to a teaching position included in teaching data may be, for example, used. The motor disturbance value data S2 may be directly calculated using a torque measurement device or the like attached to a motor.

The determination data acquisition section 108 may be configured as, for example, one of the functions of the processor 101 or software stored in the ROM 102 for functioning the processor 101. As the determination data D, the determination data acquisition section 108 may use an appropriateness determination value D1 with respect to a disturbance value of each motor in the control of a robot according to a compensated teaching position. Using the same means as that used when the state observation section 106 observes the motor disturbance value data S2, the determination data acquisition section 108 may acquire a disturbance value of each motor in the control of a robot according to a compensated teaching position. The determination data D is an index expressing a result obtained when a robot is controlled according to a teaching position under the state variables S.

In terms of the learning cycle of the learning section 110, the state variables S simultaneously input to the learning section 110 are those based on data in the previous learning cycle at which the determination data D has been acquired. As described above, while the machine learning device 100 of the controller 1 advances machine learning, the acquisition of the motor disturbance value data S2, the implementation of controlling a robot according to a teaching position compensated based on the teaching position compensation amount data S1, and the acquisition of the determination data D are repeatedly performed in an environment.

The learning section 110 may be configured as, for example, one of the functions of the processor 101 or software stored in the ROM 102 for functioning the processor 101. According to any learning algorithm called machine learning, the learning section 110 learns the teaching position compensation amount data S1 with respect to a disturbance value of each of the motors of a robot in the control of the robot according to a teaching position included in teaching data. The learning section 110 may repeatedly perform learning based on a data set including the state variables S and the determination data D described above.

When the cycle of learning the teaching position compensation amount data S1 with respect to a disturbance value of each of the motors of a robot in the control of the robot according to a teaching position included in teaching data is repeatedly performed, the motor disturbance value data S2 and the teaching position compensation amount data S1, among the state variables S, correspond, respectively, to a disturbance value of each of the motors of the robot in the control of the robot according to a teaching position included in teaching data acquired in the previous learning cycle as described above and a compensation amount of a teaching position of each of the motors of the robot in the control of the robot according to a teaching position included in teaching data obtained based on past learning results. In addition, the determination data D corresponds to an appropriateness determination result with respect to a disturbance value of each of the motors of the robot in the control of the robot according to a (compensated) teaching position in a current learning cycle in a state in which the teaching position has been compensated based on the teaching position compensation amount data S1.

By repeatedly performing such a learning cycle, the learning section 110 may automatically identify a feature suggesting the correlation between a disturbance value (the motor disturbance value data S2) of each of the motors of a robot in the control of the robot according to a teaching position included in teaching data of the robot and a compensation amount with respect to the teaching position. Although the correlation between the motor disturbance value data S2 and a compensation amount with respect to a teaching position is substantially unknown at the start of a learning algorithm, the learning section 110 gradually identifies a feature indicating the correlation and interprets the correlation as learning is advanced. When the correlation between the motor disturbance value data S2 and a compensation amount with respect to a teaching position is interpreted to a certain reliable extent, learning results repeatedly output by the learning section 110 may be used to select the action (that is, decision making) of determining to what extent a compensation amount of a teaching position is adjusted with respect to a current state (that is, a disturbance value of each of the motors of a robot in the control of the robot according to a teaching position included in teaching data of the robot). That is, as a learning algorithm is advanced, the learning section 110 may gradually approximate the correlation between a disturbance value of each of the motors of a robot in the control of the robot according to a teaching position included in teaching data of the robot and the action of determining to what extent a compensation amount of the teaching position of the robot is adjusted with respect to the state to an optimum solution.

As described above, in the machine learning device 100 of the controller 1, the learning section 110 learns a compensation amount of a teaching position of a robot according to a machine learning algorithm using the state variables S observed by the state observation section 106 and the determination data D acquired by the determination data acquisition section 108. The state variables S are composed of the teaching position compensation amount data S1 and the motor disturbance value data S2 hardly influenced by a disturbance. In addition, the determination data D is uniquely calculated by the acquisition of a current value of the servo motor 50 actually measured by the controller 1 or the like. Accordingly, using learning results of the learning section 110, the machine learning device 100 of the controller 1 may automatically and accurately calculate a compensation amount of a teaching position of a robot according to a disturbance value of each of the motors of the robot in the control of the robot according to the teaching position included in teaching data of the robot without relying on calculation or estimation.

Where it is possible to automatically calculate a compensation amount of a teaching position in the control of a robot according to the teaching position included in teaching data of the robot without relying on calculation or estimation, an appropriate value of the compensation amount of the teaching position of the robot may be quickly determined only by acquiring a disturbance value (the motor disturbance value data S2) of each motor of the robot in the control of the robot according to the teaching position included in the teaching data of the robot. Accordingly, a compensation amount of a teaching position of a robot may be efficiently determined.

As a first modified example of the machine learning device 100 of the controller 1, the state observation section 106 may further observe teaching position data S3 including a teaching position of teaching data as the state variables S. The teaching position data S3 may be acquired as a teaching position (a set of coordinate values of each of the motors of a robot) included in teaching data. The teaching position data S3 may be only a teaching position to which a robot finally moves (a final position when a workpiece is fitted in a jig in the example of FIG. 9). Besides this, the teaching position data S3 may include an approach position indicating a teaching position before the robot finally moves.

In the above modified example, the machine learning device 100 may learn a compensation amount with respect to a teaching position for both the teaching position and a disturbance value of each of the motors of a robot in the control of the robot according to the teaching position included in teaching data of the robot. Thus, since it is possible to change a compensation amount of a teaching position to an appropriate value while considering the attitude of a robot in the control of the robot based on teaching data, the disturbance of the motor of the robot may be more appropriately reduced.

As a second modified example of the machine learning device 100 of the controller 1, the determination data acquisition section 108 may use, as the determination data D, an appropriateness determination value D2 of a teaching position to which a robot finally moves, an appropriateness determination value D3 of a value detected by a sensor such as a vibration sensor and a sound sensor, an evaluation value D4 of cycle time in the control of the robot according to a compensated teaching position, or the like, besides the appropriateness determination value D1 with respect to a disturbance value of each of the motors of the robot in the control of the robot according to a teaching position included in teaching data of the robot.

According to the above modified example, the machine learning device 100 may consider a deviation degree of a teaching position, the occurrence of vibration or abnormal noise, an increase in cycle time, or the like in the learning of a compensation amount of a teaching position of a robot with respect to a disturbance value of each of the motors of the robot in the control of the robot according to the teaching position included in teaching data of the robot.

As a third modified example of the machine learning device 100 of the controller 1, the learning section 110 may learn a compensation amount of a teaching position in performing control according to the teaching position included in teaching data in a plurality of robots using the state variables S and the determination data D obtained for each of the plurality of robots that performs the same work. According to the configuration, it is possible to increase an amount of a data set including the state variables S and the determination data D acquired in a certain period of time. Therefore, the speed and the reliability of learning a compensation amount of a teaching position in the control of a robot according to the teaching position included in teaching data of the robot may be improved with a set of more various data as inputs.

Figure 3:
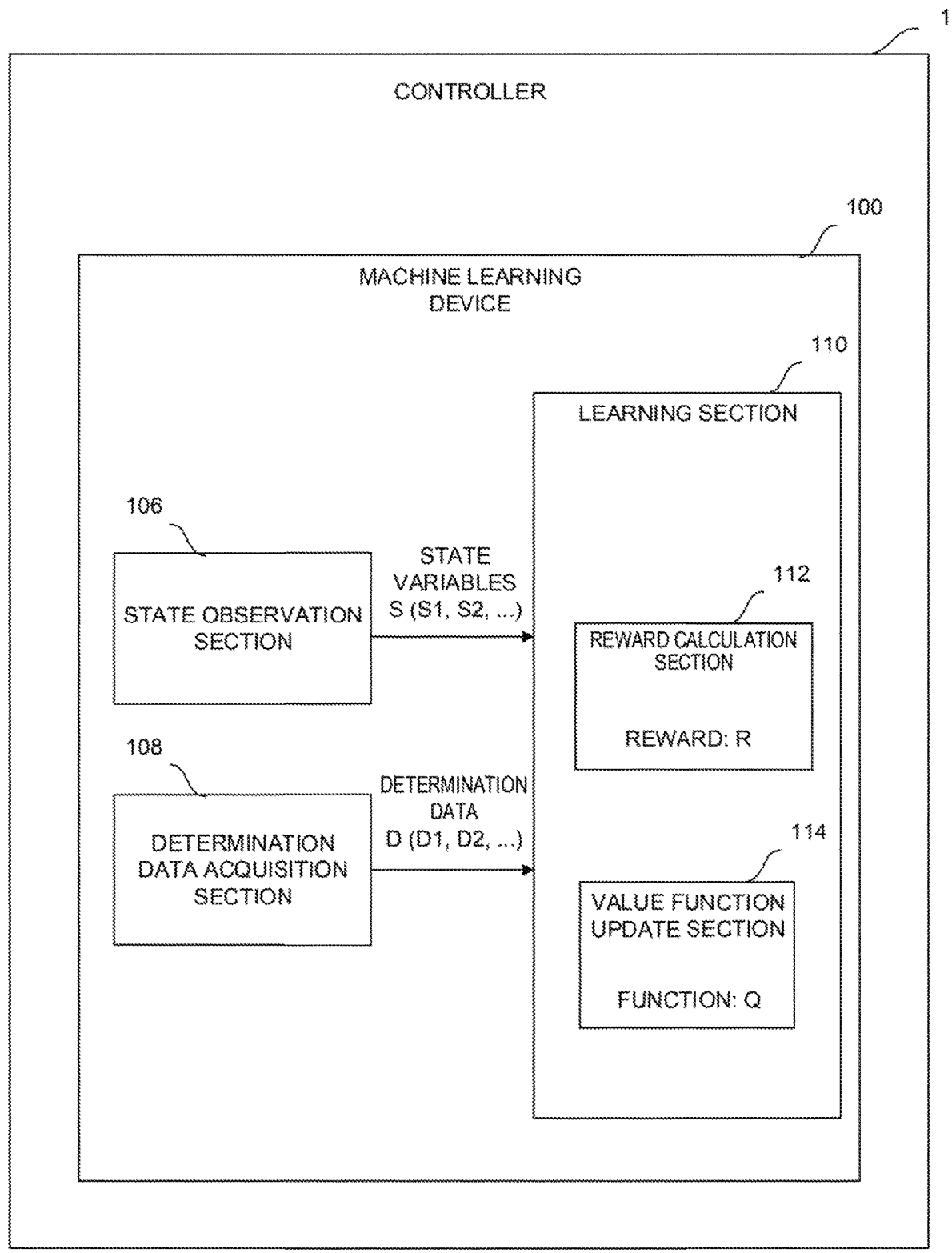
FIG. 3 is a schematic function block diagram showing an embodiment of the controller.

In the machine learning device 100 having the above configuration, a learning algorithm performed by the learning section 110 is not particularly limited. For example, a learning algorithm known as machine learning may be employed. FIG. 3 shows, as an embodiment of the controller 1 shown in FIG. 1, a configuration including the learning section 110 that performs reinforcement learning as an example of a learning algorithm.

The reinforcement learning is a method in which, while the current state (that is, an input) of an environment in which a learning target exists is observed, a prescribed action (that is, an output) is performed in the current state and the cycle of giving any reward to the action is repeatedly performed by trial and error to learn measures (a compensation amount of a teaching position in the control of a robot according to the teaching position included in teaching data of the robot in the machine learning device of the present application) to maximize the total of the rewards as an optimum solution.

In the machine learning device 100 of the controller 1 shown in FIG. 3, the learning section 110 includes a reward calculation section 112 and a value function update section 114. The reward calculation section 112 calculates a reward R, which is associated with an appropriateness determination result (corresponding to the determination data D used in the next learning cycle in which the state variables S have been acquired) of a disturbance value of each of the motors of a robot in the control of the robot according to a compensated teaching position, based on the state variables S. The value function update section 114 updates, using the calculated reward R, a function Q expressing a value of a compensation amount of a teaching position in the control of the robot according to the teaching position included in teaching data of the robot. The learning section 110 learns a compensation amount of a teaching position of a robot with respect to a disturbance value of each of the motors of the robot in the control of the robot according to the teaching position included in teaching data of the robot in such a way that the value function update section 114 repeatedly updates the function Q.

An example of a reinforcement learning algorithm performed by the learning section 110 will be described. The algorithm in this example is known as Q-learning and expresses a method in which a state s of an action subject and an action a possibly taken by the action subject in the state s are assumed as independent variables and a function Q(s, a) expressing an action value when the action a is selected in the state s is learned. The selection of the action a by which the value function Q becomes the largest in the state s results in an optimum solution. By starting the Q-learning in a state in which the correlation between the state s and the action a is unknown and repeatedly performing the selection of various actions a by trial and error in any state s, the value function Q is repeatedly updated to be approximated to an optimum solution. Here, when an environment (that is, the state s) changes as the action a is selected in the state s, a reward (that is, weighting of the action a) r is obtained according to the change and the learning is directed to select an action a by which a higher reward r is obtained. Thus, the value function Q may be approximated to an optimum solution in a relatively short period of time.

Generally, the update formula of the value function Q may be expressed like the following Formula (1). In Formula (1), $s_t$ and $a_t$ express a state and an action at time t, respectively, and the state changes to $s_{t+1}$ with the action $a_t$. $r_{t+1}$ expresses a reward obtained when the state changes from $s_t$ to $s_{t+1}$. The term maxQ expresses Q in a case in which an action a by which the maximum value Q is obtained at time t+1 (which is assumed at time t) is performed. $\alpha$ and $\gamma$ express a learning coefficient and a discount rate, respectively, and arbitrarily set to fall within $0<\alpha\le1$ and $0<\gamma\le1$, respectively.

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

When the learning section 110 performs the Q-learning, the state variables S observed by the state observation section 106 and the determination data D acquired by the determination data acquisition section 108 correspond to the state s in the update formula, the action of determining a compensation amount of a teaching position of a robot with respect to a current state (that is, a disturbance value of each of the motors of the robot in the control of the robot according to the teaching position included in teaching data of the robot) corresponds to the action a in the update formula, and the reward R calculated by the reward calculation section 112 corresponds to the reward r in the update formula. Accordingly, the value function update section 114 repeatedly updates the function Q expressing a value of a compensation amount of a teaching position of a robot with respect to a current state by the Q-learning using the reward R.

In a case where the robot is controlled according to the teaching position compensated based on a compensation amount of the teaching position determined after determination of the compensation amount of the teaching position in the control of the robot according to the teaching position included in teaching data of the robot, the reward R calculated by the reward calculation section 112 may be positive, for example, if an appropriateness determination result of the operation of a robot is determined to be "appropriate" (for example, a case in which a disturbance value of each of the motors of the robot falls within an allowable range, or a case in which a teaching position to which the robot finally moves falls within an allowable range) or may be negative, for example, if the appropriateness determination result of the operation of the robot is determined to be "inappropriate" (for example, a case in which the disturbance value of each of the motors of the robot goes beyond the allowable range, or a case in which the teaching position to which the robot finally moves goes beyond the allowable range).

The absolute values of the positive and negative rewards R may be the same or different from each other in the determination of the rewards R. In addition, as determination conditions, a plurality of values included in the determination data D may be combined together to perform a determination.

In addition, an appropriateness determination result of the operation of a robot may include not only "appropriate" and "inappropriate" results but also a plurality of levels of results. As an example, when a maximum value within an allowable range of a disturbance value of each of the motors of a robot is assumed as $V_{max}$, the reward R=5 is given if a disturbance value V of each of the motors of the robot falls within $0\le V<V_{max}/5$, the reward R=2 is given if the disturbance value falls within $V_{max}/5 \le V \le V_{max}/2$, and the reward R=1 is given if the disturbance value V falls within $V_{max}/2 \le V \le V_{max}$. In addition, $V_{max}$ may be set to be relatively larger at the initial stage of the learning and set to decrease as the learning is advanced.

The value function update section 114 may have an action value table in which the state variables S, the determination data D, and the rewards R are organized in association with action values (for example, numeric values) expressed by the function Q. In this case, the action of updating the function Q with the value function update section 114 is equivalent to the action of updating the action value table with the value function update section 114. At the start of the Q-learning, the correlation between the current state of an environment and a compensation amount of a teaching position in the control of a robot according to the teaching position included in teaching data of the robot is unknown. Therefore, in the action value table, various kinds of the state variables S, the determination data D, and the rewards R are prepared in association with values (function Q) of randomly-set action values. Note that the reward calculation section 112 may immediately calculate the rewards R corresponding to the determination data D when the determination data D is known, and values of the calculated rewards R are written in the action value table.

When the Q-learning is advanced using the reward R corresponding to an appropriateness determination result of a disturbance value of each of the motors of a robot in the control of the robot according to a teaching position included in teaching data of the robot, the learning is directed to select the action of obtaining a higher reward R. Then, values (function Q) of action values for an action performed in a current state are rewritten to update the action value table according to the state of an environment (that is, the state variables S and the determination data D) that changes as the selected action is performed in the current state. By repeatedly performing the update, values (the function Q) of action values displayed in the action value table are rewritten to be larger as an action is more appropriate. Thus, the correlation between a current state (a disturbance value of each of the motors of a robot in the control of the robot according to a teaching position included in teaching data of the robot) in an unknown environment and a corresponding action (determination of a compensation amount of the teaching position of the robot) becomes gradually obvious. That is, by the update of the action value table, the relationship between a disturbance value of each of the motors of a robot in the control of the robot according to a teaching position included in teaching data of the robot and a determination of a compensation amount of the teaching position of the robot is gradually approximated to an optimum solution.

Figure 4:
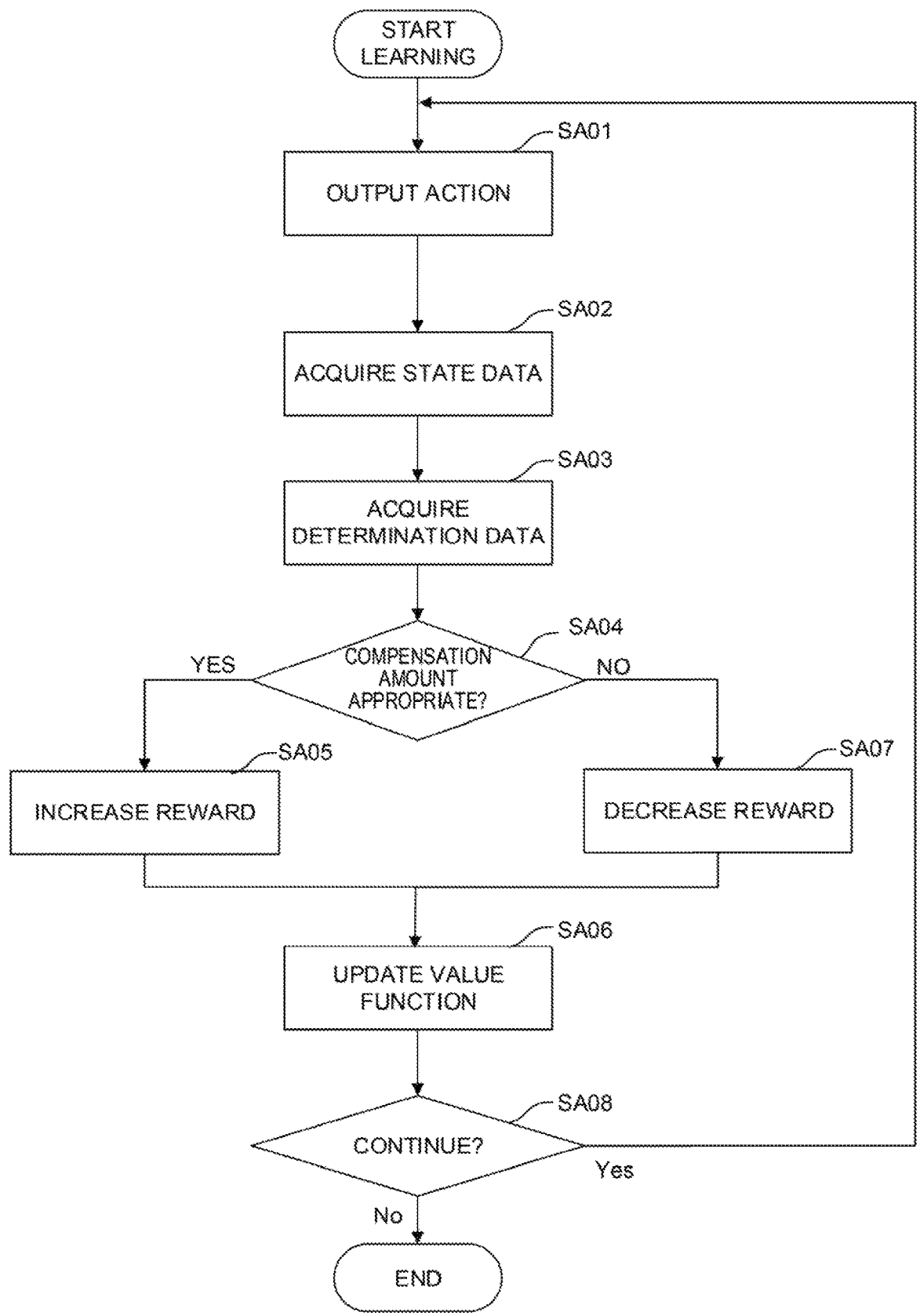
FIG. 4 is a schematic flowchart showing an embodiment of a machine learning method.

The flow of the above Q-learning (that is, an embodiment of a machine learning method) performed by the learning section 110 will be further described with reference to FIG. 4.

First, in step SA01, the value function update section 114 randomly selects, by referring to an action value table at that time, a compensation amount of a teaching position of a robot as an action performed in a current state indicated by the state variables S observed by the state observation section 106. Next, the value function update section 114 imports the state variable S in the current state observed by the state observation section 106 in step SA02, and imports the determination data D in the current state acquired by the determination data acquisition section 108 in step SA03. Then, in step SA04, the value function update section 114 determines whether the compensation amount of the teaching position of the robot is appropriate or not based on the determination data D. If the compensation amount is appropriate, in step SA04 the value function update section 114 applies a positive reward R calculated by the reward calculation section 112 to the update formula of the function Q. Next, in step SA06, the value function update section 114 updates the action value table using the state variable S and the determination data D in the current state, the reward R, and a value (updated function Q) of an action value. If it is determined in step SA04 that the compensation amount of the teaching position of the robot is inappropriate, the value function update section 114 applies a negative reward R calculated by the reward calculation section 112 to the update formula of the function Q in step SA07. Then, in step SA06, the value function update section 114 updates the action value table using the state variable S and the determination data D in the current state, the reward R, and the value (updated function Q) of the action value. The learning section 110 updates the action value table over again by repeatedly performing the above processing of steps SA01 to SA07 and advances the learning of the compensation amount of the teaching position of the robot. Note that the processing of calculating the rewards R and the processing of updating the value function in steps SA04 to SA07 are performed for each of data contained in the determination data D.

Figure 5A:
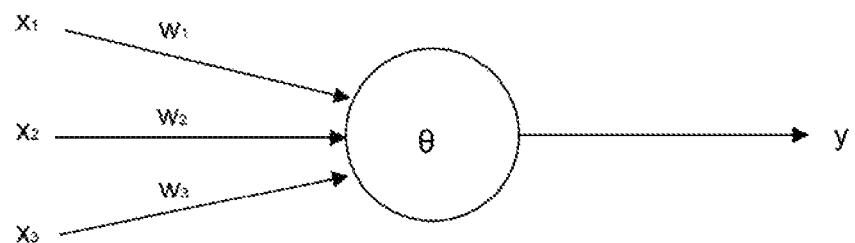
FIG. 5A is a diagram for describing a neuron.
Figure 5B:
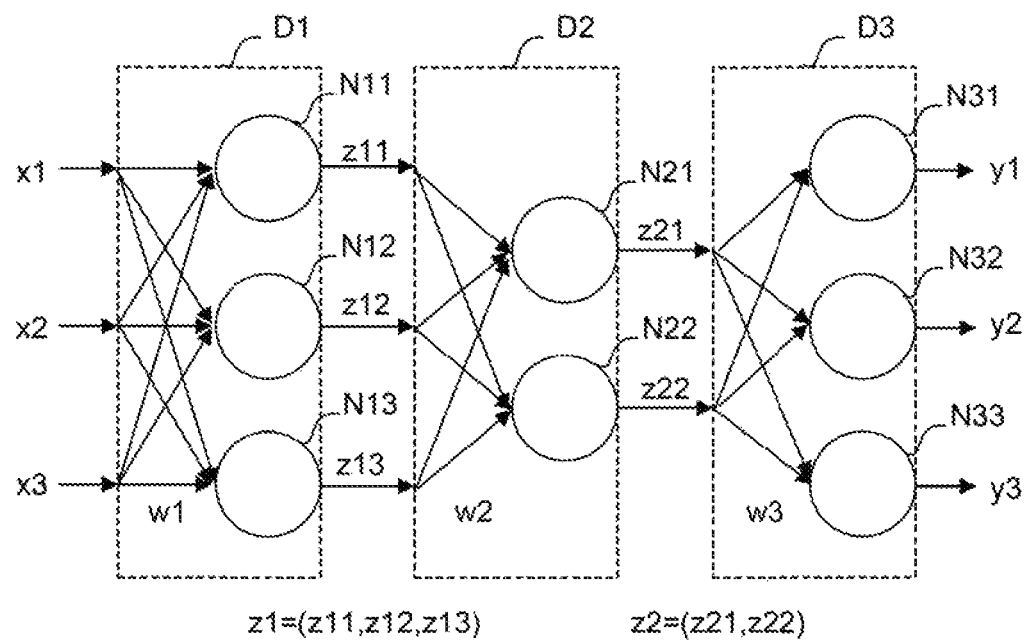
FIG. 5B is a diagram for describing a neural network.

In advancing the above reinforcement learning, a neural network may be used instead of, for example, the Q-learning. FIG. 5A schematically shows a neuron model. FIG. 5B schematically shows the model of a neural network having three layers in which the neurons shown in FIG. 5A are combined together. The neural network may be configured by, for example, a calculation unit or a storage unit following a neuron model.

The neuron shown in FIG. 5A outputs a result y with respect to a plurality of inputs x (here, inputs $x_1$ to $x_3$ as an example). The inputs $x_1$ to $x_3$ are multiplied by corresponding weights w ($w_1$ to $w_3$), respectively. Thus, the neuron outputs the result y expressed by the following Formula 2. Note that in the following Formula 2, an input x, a result y, and a weight w are all vectors. In addition, θ expresses a bias, and $f_k$ expresses an activation function.

$$y = f_k(\Sigma_{i=1}^{n} x_i w_i - \theta) \quad (2)$$

In the neural network having the three layers shown in FIG. 5B, a plurality of inputs x (here, inputs x1 to x3 as an example) is input from the left side of the neural network, and results y (here, results y1 to y3 as an example) are output from the right side of the neural network. In the example shown in FIG. 5B, the inputs x1 to x3 are multiplied by corresponding weights (collectively expressed as w1) and input to three neurons N11 to N13, respectively.

In FIG. 5B, the respective outputs of the neurons N11 to N13 are collectively expressed as z1. The outputs z1 may be regarded as feature vectors obtained by extracting feature amounts of the input vectors. In the example shown in FIG. 5B, the respective feature vectors z1 are multiplied by corresponding weights (collectively expressed as w2) and input to two neurons N21 and N22, respectively. The feature vectors z1 express the features between the weights w1 and the weights w2.

In FIG. 5B, the respective outputs of neurons N21 and N22 are collectively expressed as z2. The outputs z2 may be regarded as feature vectors obtained by extracting feature amounts of the feature vectors z1. In the example shown in FIG. 5B, the respective feature vectors z2 are multiplied by corresponding weights (collectively expressed as w3) and input to three neurons N31 to N33, respectively. The feature vectors z2 express the features between the weights w2 and the weights w3. Finally, the neurons N31 to N33 output the results y1 to y3, respectively.

Note that it is possible to employ so-called deep learning in which a neural network forming three or more layers is used.

In the machine learning device 100 of the controller 1, the learning section 110 performs the calculation of the state variables S and the determination data D as inputs x in a multilayer structure according to the above neural network so that the learning section 110 may output a compensation amount (result y) of a teaching position of a robot. In addition, in the machine learning device 100 of the controller 1, the learning section 110 uses a neural network as a value function in reinforcement learning and performs the calculation of the state variables S and the action a as inputs x in a multilayer structure according to the above neural network so that the learning section 110 may output a value (result y) of the action in the state. Note that the action mode of the neural network includes a learning mode and a value prediction mode. For example, it is possible to learn a weight w using a learning data set in the learning mode and determine an action value using the learned weight w in the value prediction mode. Note that detection, classification, deduction, or the like may be performed in the value prediction mode.

The configuration of the above controller 1 may be described as a machine learning method (or software) performed by the processor 101. The machine learning method is a method for learning a compensation amount of a teaching position in the control of a robot according to the teaching position included in teaching data of the robot. The machine learning method includes:

a step of observing, by the CPU of a computer, teaching position compensation amount data S1 indicating a compensation amount of a teaching position in the control of the robot according to the teaching position included in teaching data of the robot and motor disturbance value data S2 indicating a disturbance value of each of the motors of the robot in the control of the robot according to the teaching position included in the teaching data of the robot, as state variables S expressing the current state of an environment in which the robot is controlled;

a step of acquiring determination data D indicating an appropriateness determination result of the disturbance value of each of the motors of the robot in the control of the robot according to the compensated teaching position; and a step of learning the motor disturbance value data S2 and the compensation amount of the teaching position of the robot in association with each other using the state variables S and the determination data D.

Figure 6:
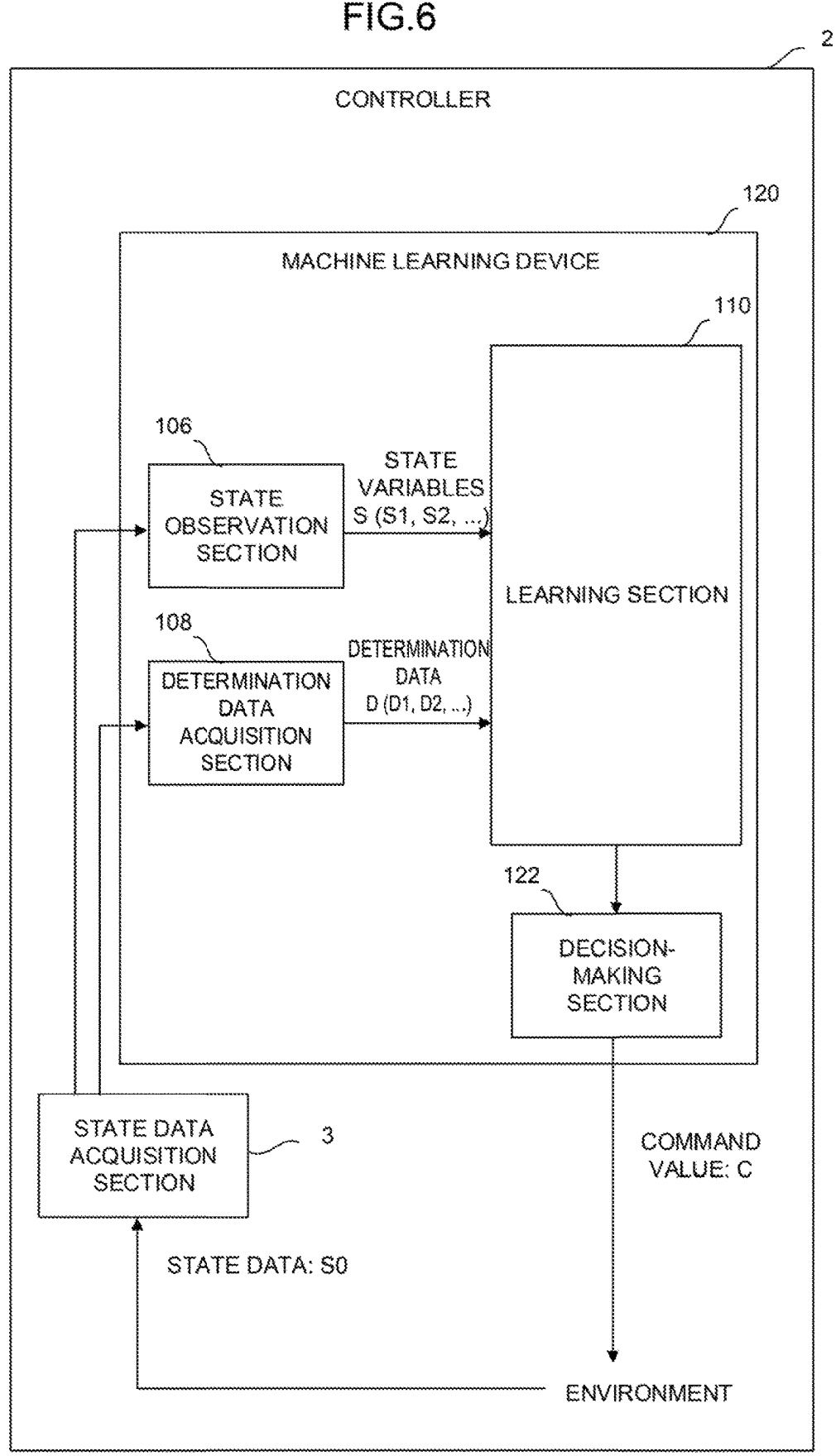
FIG. 6 is a schematic function block diagram of a controller according to a second embodiment.

FIG. 6 shows a controller 2 according to a second embodiment.

The controller 2 includes a machine learning device 120 and a state data acquisition section 3. The state data acquisition section 3 acquires, as state data S0, teaching position compensation amount data S1 and disturbance value data S2 of state variables S observed by a state observation section 106. The state data S0 acquired by the state data acquisition section 3 may also include teaching position data S3 including a teaching position of teaching data, or the like. The state data acquisition section 3 may acquire the state data S0 from each section of the controller 2, various sensors of a machine tool, appropriate data inputs by a worker, or the like.

The machine learning device 120 of the controller 2 includes, besides software (such as a learning algorithm) and hardware (such as the processor 101) for spontaneously learning a compensation amount of a teaching position in the control of a robot according to the teaching position included in teaching data of the robot through machine learning, software (such as a calculation algorithm) and hardware (such as the processor 101) for outputting the learned compensation amount of the teaching position in the control of the robot according to the teaching position included in the teaching data of the robot as a command for the controller 2. The machine learning device 120 of the controller 2 may be so configured that one common processor performs all software such as a learning algorithm and a calculation algorithm.

A decision-making section 122 may be configured as, for example, one of the functions of the processor 101 or software stored in the ROM 102 for functioning the processor 101. The decision-making section 122 generates and outputs a command value C including a command for determining a compensation amount of a teaching position of a robot with respect to a disturbance value of each of the motors of the robot in the control of the robot according to the teaching position included in teaching data of the robot based on a learning result of the learning section 110. When the decision-making section 122 outputs the command value C to the controller 2, the state of an environment changes accordingly.

The state observation section 106 observes, in a next learning cycle, state variables S that have changed after the output of the command value C to an environment by the decision-making section 122. The learning section 110 updates, for example, a value function Q (that is, an action value table) using the changed state variables S to learn a compensation amount of a teaching position in the control of a robot according to the teaching position included in teaching data of the robot. Note that the state observation section 106 may acquire the teaching position compensation amount data S1 from a RAM 103 of the machine learning device 120 as described in the first embodiment, instead of acquiring the same from the state data S0 acquired by the state data acquisition section 3.

Based on a learned compensation amount of a teaching position in the control of a robot according to the teaching position included in teaching data of the robot, the decision-making section 122 outputs the command value C to the controller 2 according to the state variables S.

By repeatedly performing the learning cycle, the machine learning device 120 advances the learning of a compensation amount of a teaching position in the control of a robot according to the teaching position included in teaching data of the robot and gradually improves the reliability of the compensation amount of the teaching position in the control of the robot according to the teaching position included in the teaching data of the robot determined by the machine learning device 120 itself.

The machine learning device 120 of the controller 2 having the above configuration produces the same effect as that of the machine learning device 100 described above. Particularly, the machine learning device 120 may change the state of an environment with the output of the decision-making section 122. On the other hand, the machine learning device 100 may ask an external apparatus for a function corresponding to the decision-making section for reflecting a learning results of the learning section 110 on an environment.

Figure 7:
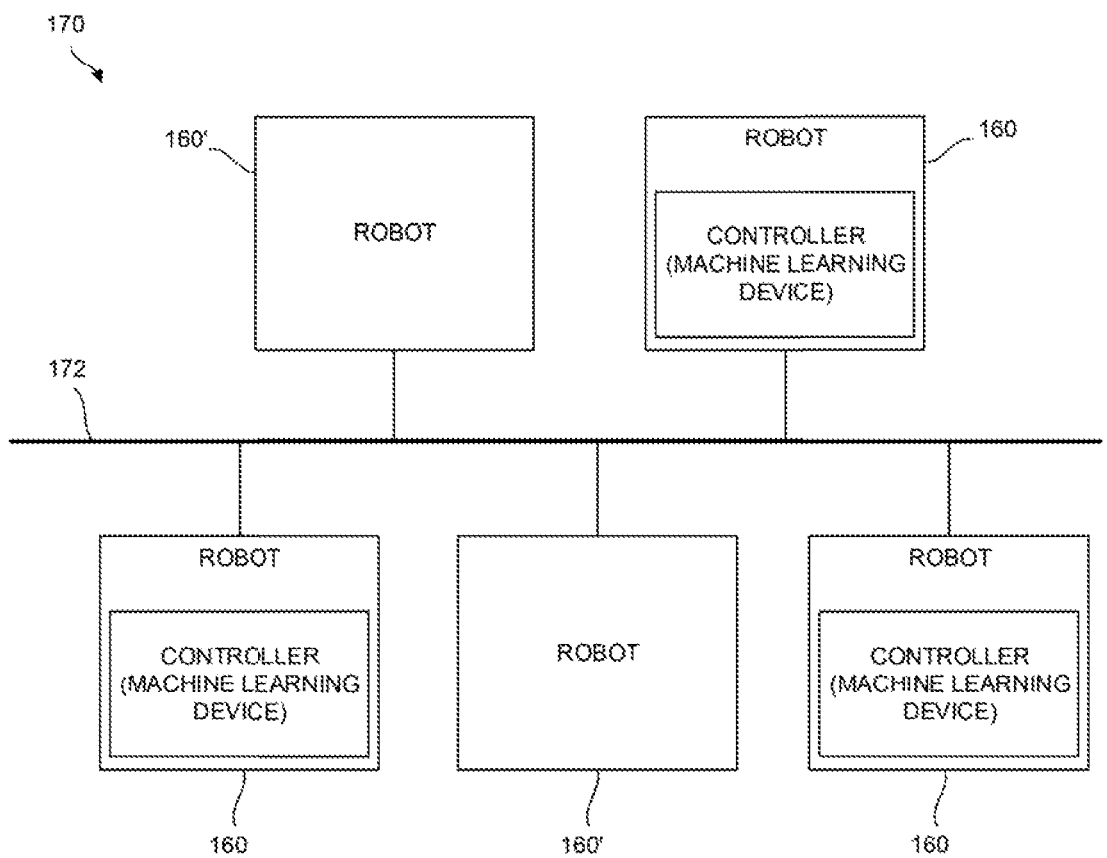
FIG. 7 is a schematic function block diagram showing an embodiment of a system including a plurality of robots.

FIG. 7 shows a system 170 including robots 160 according to an embodiment.

The system 170 includes at least a plurality of robots 160 and 160' that performs the same operation and a wired/wireless network 172 that connects the robots 160 and 160' to each other. At least one of the plurality of robots 160 is configured as a robot 160 including the above controller 2. In addition, the system 170 may have robots 160' that do not include the controller 2. The robots 160 and 160' have a mechanism needed to perform an operation for the same purpose, without relying on calculation or estimation.

In the system 170 having the above configuration, the robots 160 including the controller 2 among the plurality of robots 160 and 160' may automatically and accurately calculate a compensation amount of a teaching position of a robot with respect to a disturbance value of each of the motors of the robot in the control of the robot according to the teaching position included in teaching data of the robot without relying on calculation or estimation using learning results of the learning section 110. In addition, the controller 2 of at least one of the robots 160 may learn a compensation amount of a teaching position in the control of a robot according to the teaching position included in teaching data of the robot common to all the robots 160 and 160' based on state variables S and determination data D obtained for each of the other plurality of robots 160 and 160' so that the learning results are shared between all the robots 160 and 160'. Accordingly, the system 170 makes it possible to improve the speed and the reliability of learning a compensation amount of a teaching position in the control of a robot according to the teaching position included in teaching data of the robot with a broader range of data sets (including state variables S and determination data D) as inputs.

Figure 8:
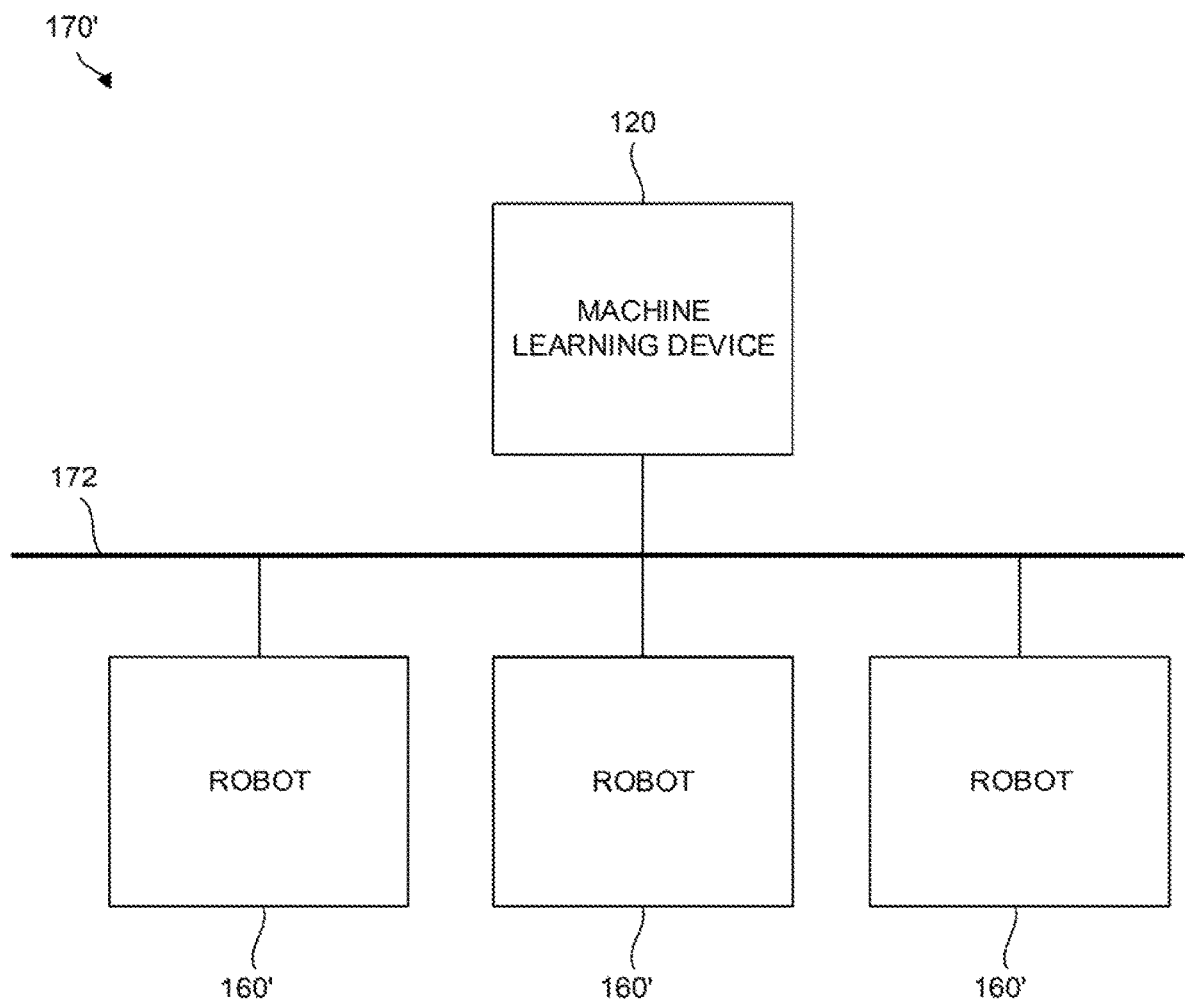
FIG. 8 is a schematic function block diagram showing another embodiment of a system including a plurality of robots.

FIG. 8 shows a system 170' including a plurality of robots 160' according to another embodiment.

The system 170' includes the machine learning device 120 (or 100), the plurality of robots 160' having the same machine configuration, and a wired/wireless network 172 that connects the robots 160' and the machine learning device 120 (or 100) to each other.

In the system 170' having the above configuration, the machine learning device 120 (or 100) may learn a compensation amount of a teaching position of a robot with respect to a disturbance value of each of the motors of the robot in the control of the robot according to the teaching position included in teaching data of the robot common to all the robots 160' based on state variables S and determination data D obtained for each of the plurality of robots 160', and automatically and accurately calculate the compensation amount of the teaching position of the robot with respect to the disturbance value of each of the motors of the robot in the control of the robot according to the teaching position included in the teaching data of the robot using the learning results.

In the system 170', the machine learning device 120 (or 100) may have a configuration existing in a cloud server or the like provided in the network 172. According to the configuration, a desired number of the robots 160' may be connected to the machine learning device 120 (or 100) where necessary regardless of the existing locations and the times of the plurality of robots 160'.

Workers engaging in the systems 170 and 170' may perform a determination as to whether the achievement degree (the reliability of the compensation amount of the teaching position in the control of the robot according to the teaching position included in the teaching data of the robot) of learning a compensation amount of a teaching position in the control of a robot according to the teaching position included in teaching data of the robot with the machine learning device 120 (or 100) has reached a required level at an appropriate timing after the start of learning by the machine learning device 120 (or 100).

The embodiments of the present invention are described above. However, the present invention is not limited to the examples of the above embodiments and may be carried out in various modes with the addition of appropriate modifications.

For example, a learning algorithm performed by the machine learning devices 100 and 120, a calculation algorithm performed by the machine learning device 120, and a control algorithm performed by the controllers 1 and 2 are not limited to the above algorithms, but various algorithms may be employed.

In addition, the above embodiments describe a configuration in which the controller 1 (or 2) and the machine learning device 100 (or 120) have a different CPU. However, the machine learning device 100 (or 120) may be realized by the CPU 11 of the controller 1 (or 2) and a system program stored in the ROM 12.

Moreover, the above embodiments describe a configuration in which the controller 2 controls a compensation amount of a teaching position in the control of a robot according to the teaching position included in teaching data of the robot based on the command value C output from the machine learning device 120. However, the command value C output from the machine learning device 120 may be displayed on the display device of a teach pendant as a reference used when a worker performs teaching.

The invention claimed is:

1. A controller that determines a compensation amount of a teaching position in control of a robot according to the teaching position included in teaching data, the controller comprising:
    a machine learning device that learns a compensation amount of the teaching position in the control of the robot according to the teaching position, wherein
    the machine learning device has
    a state observation section that observes, as state variables expressing a current state of an environment, teaching position compensation amount data indicating the compensation amount of the teaching position in the control of the robot according to the teaching position, motor disturbance value data indicating a disturbance value of each of motors of the robot in the control of the robot, and teaching position data including the teaching position of the teaching data,
    a determination data acquisition section that acquires determination data indicating an appropriateness determination result of the disturbance value of each of the motors of the robot in the control of the robot, and
    a learning section that learns the compensation amount of the teaching position of the robot in association with the motor disturbance value data and the teaching position by using the state variables and the determination data.

2. The controller according to claim 1, wherein
    the determination data includes, besides the appropriateness determination result of the disturbance value of each of the motors of the robot in the control of the robot, at least any of an appropriate determination result of a teaching position to which the robot finally moves, an appropriateness determination result of a value detected by a sensor, and an appropriateness determination result of cycle time in the control of the robot according to the teaching position after compensation.

3. The controller according to claim 1, wherein
    the learning section has
    a reward calculation section that calculates a reward associated with the appropriateness determination result, and
    a value function update section that updates by using the reward a function expressing a value of the compensation amount of the teaching position relative to the disturbance value of each of the motors of the robot in the control of the robot.

4. The controller according to claim 1, wherein
    the learning section performs calculation of the state variables and the determination data on the basis of a multilayer structure.

5. The controller according to claim 1, further comprising:
    a decision-making section that outputs a command value based on the compensation amount of the teaching position in the control of the robot according to the teaching position on a basis of a learning result of the learning section.

6. The controller according to claim 1, wherein
the learning section learns the compensation amount of the teaching position in the control of the robot according to the teaching position in each of a plurality of robots by using the state variables and the determination data obtained for each of the plurality of robots.

7. The control according to claim 1, wherein
the machine learning device exists in a cloud server.

8. A machine learning device that learns a compensation amount of a teaching position in control of a robot according to the teaching position included in teaching data,
the machine learning device comprising:
a state observation section that observes, as state variables expressing a current state of an environment, teaching position compensation amount data indicating the compensation amount of the teaching position in the control of the robot according to the teaching position, motor disturbance value data indicating a disturbance value of each of motors of the robot in the control of the robot, and teaching position data including the teaching position of the teaching data;
a determination data acquisition section that acquires determination data indicating an appropriateness determination result of the disturbance value of each of the motors of the robot in the control of the robot; and
a learning section that learns the compensation amount of the teaching position of the robot in association with the motor disturbance value data and the teaching position by using the state variables and the determination data.

* * * * *